United States Patent
Hong et al.

(10) Patent No.: US 8,726,133 B2
(45) Date of Patent: May 13, 2014

(54) METHOD FOR DETECTING RETURN LINK PACKET ERROR IN HUB WHICH COMMUNICATES WITH SATELLITE TERMINAL AND APPARATUS THEREOF

(75) Inventors: Hyun-Ha Hong, Seoul (KR); Min-Su Shin, Daejeon-si (KR); Man-Kyu Park, Daejeon-si (KR); Deock-Gil Oh, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 97 days.

(21) Appl. No.: 13/314,658

(22) Filed: Dec. 8, 2011

(65) Prior Publication Data

US 2012/0159291 A1 Jun. 21, 2012

(30) Foreign Application Priority Data

Dec. 21, 2010 (KR) ........................ 10-2010-0131576

(51) Int. Cl.
*H03M 13/03* (2006.01)
(52) U.S. Cl.
USPC .......................................................... 714/776
(58) Field of Classification Search
USPC .......................................................... 714/776
See application file for complete search history.

(56) References Cited

U.S. PATENT DOCUMENTS

| | | | |
|---|---|---|---|
| 6,510,172 B1* | 1/2003 | Miller | 375/140 |
| 7,076,718 B2* | 7/2006 | Miyoshi | 714/748 |
| 8,320,296 B2* | 11/2012 | Becker et al. | 370/316 |
| 8,325,591 B2* | 12/2012 | Chakravarty et al. | 370/208 |
| 2006/0176843 A1* | 8/2006 | Gat et al. | 370/316 |
| 2008/0274690 A1 | 11/2008 | Laufer | |
| 2011/0194587 A1* | 8/2011 | Ram | 375/141 |
| 2013/0010750 A1* | 1/2013 | Hoshino et al. | 370/330 |

FOREIGN PATENT DOCUMENTS

| | | |
|---|---|---|
| EP | 1 906 578 | 4/2008 |
| KR | 10-0826526 | 4/2008 |
| KR | 10-2010-0017200 | 2/2010 |

* cited by examiner

*Primary Examiner* — James C Kerveros
(74) *Attorney, Agent, or Firm* — Staas & Halsey LLP

(57) ABSTRACT

When errors occur in a packet received from a satellite terminal device, a modulation and coding (MODCOD) value is calculated according to a result of the detection, and a calculated MODCOD value is transmitted to the satellite terminal device, so that packet loss is reduced based on the yield of actual traffic when the satellite terminal device transmits a return link packet. An occurrence of a packet error is detected by generating a first return link packet by sequentially assembling the plurality of return link packets from the satellite terminal device and performing a comparison analysis by comparing the first return link packet with a newly received second return link packet.

9 Claims, 11 Drawing Sheets

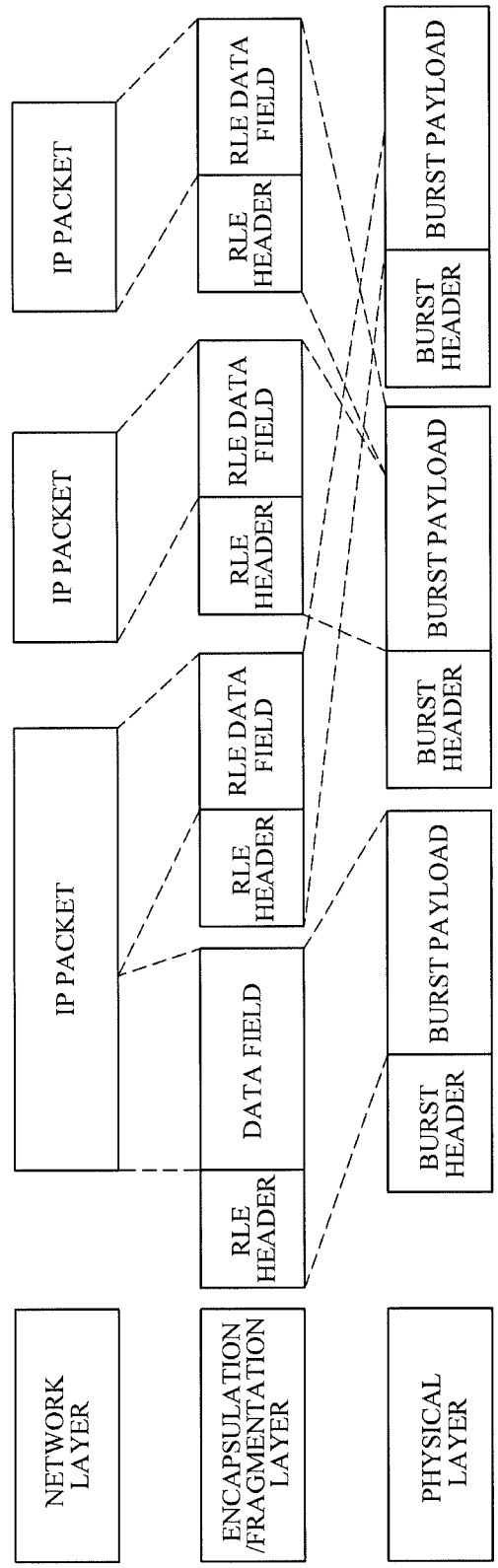

METHOD FOR DETECTING RETURN LINK PACKET ERROR IN HUB WHICH COMMUNICATES WITH SATELLITE TERMINAL AND APPARATUS THEREOF

CROSS-REFERENCE TO RELATED APPLICATION

This application claims the benefit under 35 U.S.C. §119 (a) of Korean Patent Application No. 10-2010-0131576, filed on Dec. 21, 2010, the disclosure of which is incorporated by reference in its entirety for all purposes.

BACKGROUND

1. Field

The following description relates to a method and apparatus for detecting error in a packet transmission, and more particularly, to a method for detecting a packet error of a return link from a satellite terminal to a hub and an apparatus thereof.

2. Description of the Related Art

In recent years, a satellite communication technology is achieved by use of Very Small Aperture Terminal (VSAT) having a small capacity and a low power consumption. Such a satellite communication technology is considered as the only way to provide communication services to a high speed moving object in addition to a location having a difficulty in connecting to a ground network. Accordingly, many studies have been undertaken on this technology. In particular, the current satellite communication system can construct global service infrastructure and further provide high quality communication services, proceeding a project to construct a ubiquitous network environment supporting system.

In a two way satellite communication system, transmission of broadcasting and communication data from a hub to a satellite terminal device (or a station) is achieved through a forward link conforming to Digital Video Broadcasting via Satellite (DVB-S) standards, and transmission of broadcasting and communication data from a satellite terminal device (or a station) to a hub is achieved through a return link conforming to Digital Video Broadcasting-Return Channel via Satellite (DVB-RCS) standard.

Meanwhile, as a satellite network based internet service has been increasing used, there is a need for a technology in which fixed/mobile satellite terminal devices maintain an established session in a predetermined level of quality even at a rainfall attenuation environment. To this end, an example of conventional technology calculates signal to noise ratio (SNR) for a DVB-S2 forward link and controls ACM (Adaptive Coding and Modulation) of a satellite terminal device by use of the calculated SNR. Alternatively, according to another example, various types of services are provided while maintaining a predetermined amount of transmitted packets through a channel adaptive packet scheduling according to the weather condition.

However, the conventional technology performs the ACM controlling by measuring the SNR for a link, having a difficulty in maintaining the quality of services based on the yield of actual traffic.

SUMMARY

The following description relates to a technology in which it is detected whether errors occur in a packet received from a satellite terminal device, a modulation and coding (MODCOD) value is calculated according to a result of the detection and the calculated MODCOD value is transmitted to the satellite terminal device, so that pack loss is reduced during a packet transmission by the satellite terminal device.

In one general aspect, there is provided a method for detecting a return link packet error in a hub which communicates with a satellite terminal device, the method including: receiving a plurality of return link packets from the satellite terminal device; and detecting an occurrence of a packet error by generating a first return link packet by sequentially assembling the plurality of return link packets and performing a comparison analysis by comparing the first return link packet with a second return link packet that is newly received.

In another general aspect, there is provided an apparatus for detecting a return link packet error in a hub which communicates with a satellite terminal device, the apparatus including: a sending unit configured to transmit a forward link packet to the satellite terminal device; a receiving unit configured to receive a plurality of return link packets from the satellite terminal device; and an error detection unit configured to detect an occurrence of a packet error by generating a first return link packet by sequentially assembling the plurality of return link packets and to perform a comparison analysis by comparing the first return link packet with a second return link packet that is newly received.

As described above, it is detected whether errors occur in a packet received from a satellite terminal device, a modulation and coding (MODCOD) value is calculated according to a result of the detection and the calculated MODCOD value is transmitted to the satellite terminal device, so that pack loss is reduced during a packet transmission by the satellite terminal device.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 3 illustrates an example of a process of generating IP packets by use of return link packets.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings in detail.

Figure 1:
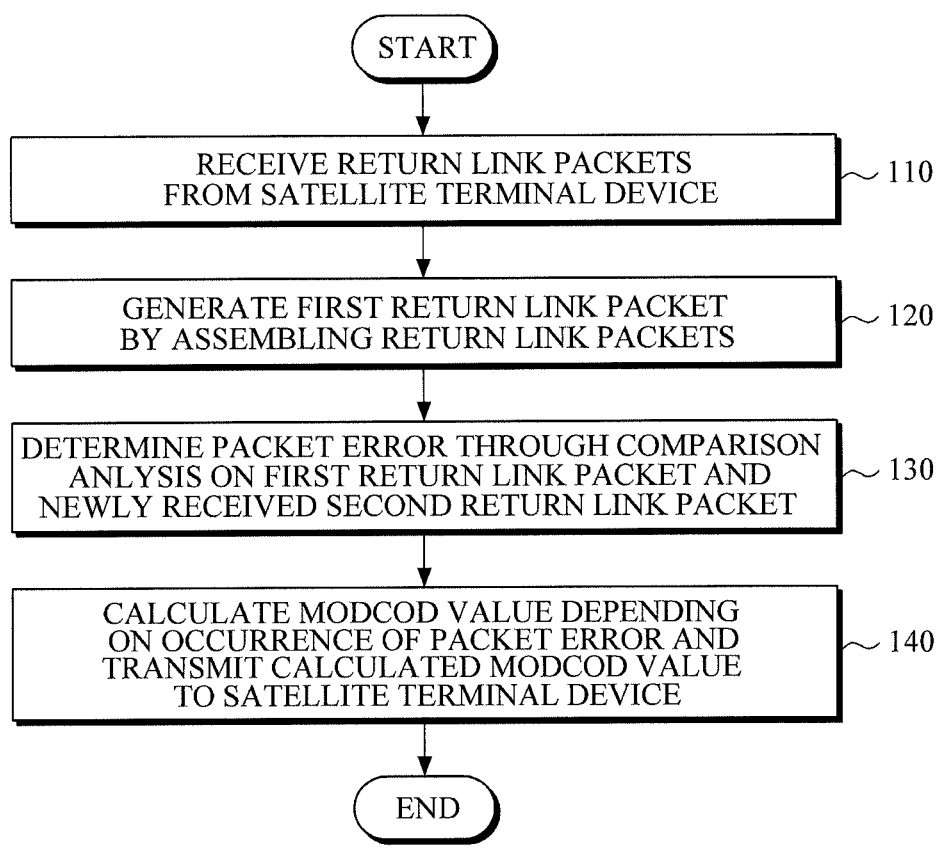
FIG. 1 illustrates an example of the control flow of a method for detecting packet errors.

FIG. 1 illustrates an example of the control flow of a method for detecting packet errors.

As shown in FIG. 1, a return link packet is received from a satellite terminal device (110). In a two way satellite communication system, transmission of broadcasting and communication data from a hub to a satellite terminal device (or a station) is achieved through a forward link conforming to Digital Video Broadcasting via Satellite (DVB-S) standard, and transmission of broadcasting and communication data from a satellite terminal device (or a station) to a hub is achieved through a return link conforming to Digital Video Broadcasting-Return Channel via Satellite (DVB-RVS) standard. Accordingly, the satellite terminal device transmits data by use of a return link.

Return link packets are implemented by splitting a return link packet into a plurality of packets at the satellite terminal device and transmitting the split packets. The return link packet may be one of a start packet, an intermediate packet and an end packet. The start packet, the intermediate packet and the end packet are sequentially transmitted from the satellite terminal device to a hub. The intermediate packet of the return link packets may optionally include sequence information corresponding to a packet before splitting to the intermediate packet. The end packet of the return link packets includes sequence information corresponding to a packet before splitting to the end packet. The structure and the type of the return link packet will be described later with reference to FIG. 2.

Figure 2:
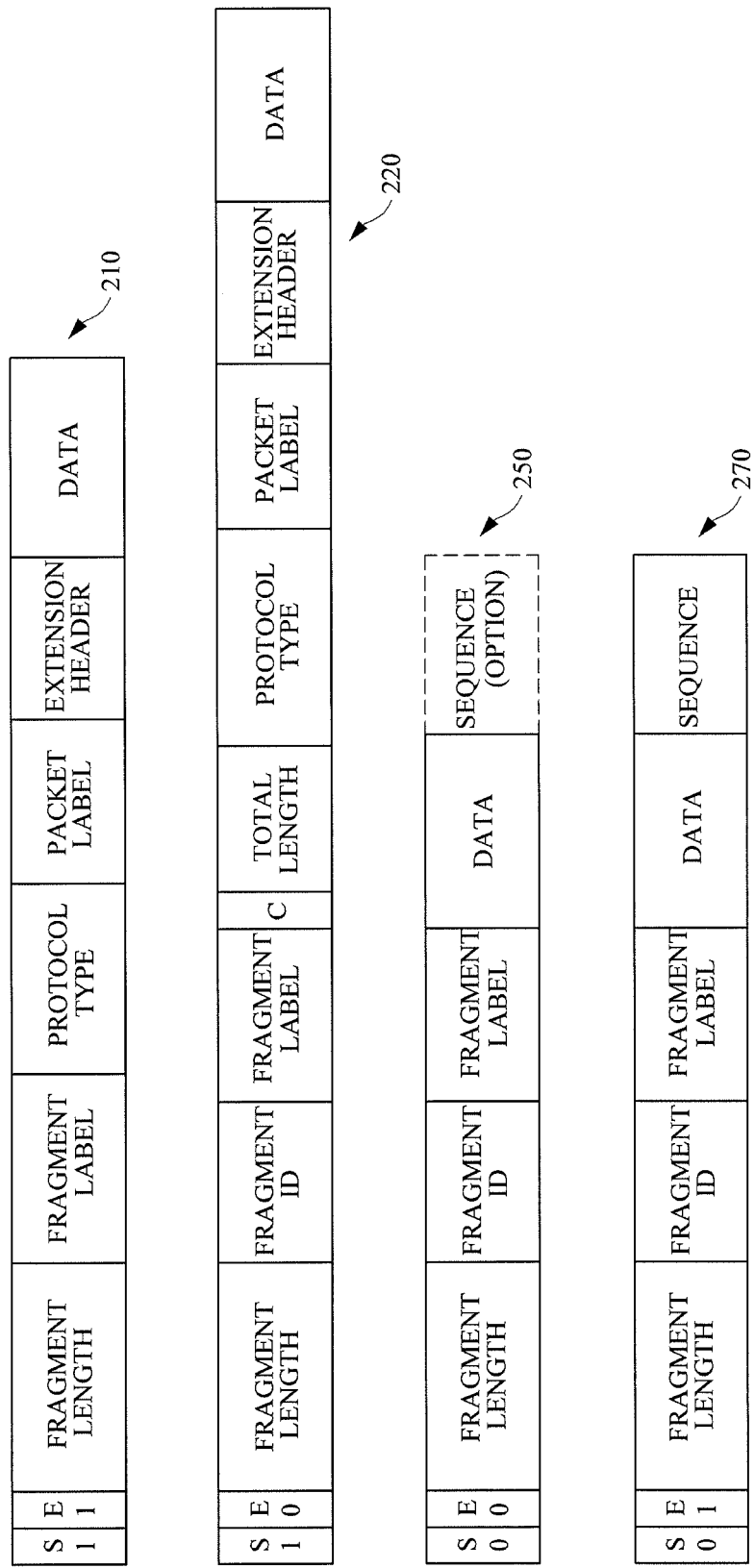
FIG. 2 illustrates an example of the structure of various kinds of return link packets.

FIG. 2 illustrates an example of the structure of various kinds of return link packets.

As show in FIG. 2, a return link packet includes types of a return link packet 210 that has not been split, a start packet 230 that has been split, an intermediate packet 250 that has been split and an end packet 270 that has been split. A return link packet transmitted from the satellite terminal device is a return link packet that has been split in the satellite terminal device. In addition, a return link packet may be transmitted without being split from the satellite terminal device. When the packet is transmitted in the form of a split packet, the start packet 230, the intermediate packet 250 and the end packet 270 forming a set are sequentially transmitted as long as the set of the start packet 230, the intermediate packet 250 and the end packet 270 does not experience loss.

In addition, the return link packet includes at least one of packet fragmentation information, packet sequence information, fragment ID information and sequence alignment (SA) information. The return link packet has a structure including a Start/End (S/E) field, a fragment length field, a fragment label field, a protocol type field, a packet label field, an extension header field and a data field. The S/E field represents fragmentation information about a return link packet. The S/E field where S=1 and E=1 indicates the return link packet 210 having not been split. The S/E field where S=1 and E=0 indicates the start packet 230. The S/E field where S=0 and E=0 indicates the intermediate packet 250. It is optional for the intermediate packet to include sequence information. The S/E field where S=0 and E=1 indicates the end packet 270.

The fragment label defines a fragment switching label. The protocol type field defines a Protocol Data Unit (PDU) type and the presence of an extension header. The packet label field defines an Ethernet compatibility. The extension header field provides extensibility to upper layer information, and defines Unidirectional Lightweight Encapsulation (ULE) standards. The fragment ID field is used to assemble the split return link packets.

The start packet 230 includes a total length field. The total length field serves as a criteria to detect an assembling error at original packet lengths during assembling of the return link packets. For example, when the end packet 270 is received, if the total length of packets is shorter or longer than the length defined in the total length field, it is determined that an error occurs during the assembling process.

The intermediate packet 250 may include a sequence information field as an option that is used to detect an error during the assembling process of the return link packets. When the packet is split in the satellite terminal device, a sequence information field is optionally defined in at least one of a plurality of intermediate packets 250 by use of a value of change of sequence information of a next packet corresponding to. The hub receiving a return link packet compares sequence information included in the received intermediate packet 250 with sequence information of a next packet. In this case, if the sequence information of the next packet is not identical to the sequence information of the received intermediated packet 250, it is determined that a return link packet loss occurs.

Meanwhile, the end packet 270 includes a sequence information field. The sequence information field is used to detect an error during the assembling process of the return link packets. When the packet is split in the satellite terminal device, a sequence information field is defined in the end packet 270 by use of a value of change of sequence information of a next packet. The hub receiving a return link packet compares sequence information included in the received end packet 270 with sequence information of a next packet. In this case, if the sequence information of the next packet is identical to the sequence information of the received end packet 270, it is determined that a return link packet loss does not occur.

Referring again to FIG. 1, a first return link packet is generated by the received return link packets (120). The hub receives a plurality of return link packets and assembles the received packets into a single packet. The first return link packet represents an assembled packet. The first return link packet may represent a complete packet or an incomplete packet that is obtained by adding at least two return link packets to each other. The first return link may be generated by sequentially assembling return link packets. A process of generating an IP packet by use of the assembled return link packet will be described later with reference to FIG. 3.

FIG. 3 illustrates an example of a process of generating IP packets by use of return link packets.

As shown in FIG. 3, the hub has a data structure including a physical layer, encapsulation/fragmentation layer and a network layer. The physical layer performs a Cyclic Redundancy Check on burst received from the satellite terminal device and transmits burst payload data to the upper layer. In this case, a plurality of return link packets in the satellite terminal device according to the length of the traffic burst payload of the physical layer of the hub are transmitted.

The encapsulation/fragmentation layer corresponding to an upper layer of the physical layer analyzes a header of the return link packet for each burst payload. The encapsulation/fragmentation layer assembles the split return link packet payload data into an IP packet. At this time, a test on an error in assembling the return link packets is performed. If an error does not occur, the encapsulation/fragmentation layer transmits the assembled IP packet to the network layer corresponding to a upper layer of the encapsulation/fragmentation layer. In this manner, an IP packet is generated from traffic burst by use of return link between the satellite terminal device and the hub by sequentially passing through the physical layer, the encapsulation/fragmentation layer and the network layer.

Referring again to FIG. 1, a first return link packet assembled as described above is compared with a second return link packet followed by the first return link packet, thereby determining an error of the packet assembly (140). The second link packet represents a return link packet that is received after the first return link packet is generated. Information of the first return link packet is compared with information of the second return link packet. As a result of the comparison analysis, the first return link packet and/or the second return link packet is deleted.

In order to determine whether an error of packet assembly occurs, the first return link packet is compared with the second return link packet based on the length of the first return link packet. By comparing the summation of the data lengths of the first return link packet and the second return link packet with the total data length that is preliminarily set, the error of packet assembly is determined. As described above, the start packet of the second return link packet includes the total data length field.

In addition, based on the presence of the first return link packet and a result of analysis of to fragmentation information of the second return link packet, the error of packet assembly is determined. The first return link packet represent a sequential addition of return link packets. If the first return link packet does not exist, the second return link packet needs to serve as a start packet. In this case, if the second return link packet is determined as an intermediate packet or an end packet, the second return link is determined as an error.

In addition, the first return link packet includes an end packet, sequence information of the end packet and sequence information of a next packet are checked. In this case, if the second return link packet is an intermediate packet having sequence information or an end packet having sequence information, the sequence information of an intermediate packet or the end packet included in the first return link packet is compared with the sequence information of the next packet, thereby determining the error of packet assembly. That is, by use of sequence information about a predetermined packet and next packet sequence information that are determined when the satellite terminal device splits packets, if the sequence information does not continue, it is determined that an packet error has occurred. The determining of packet error will be described in detail with reference to FIGS. 4A to 5.

Figure 4A:
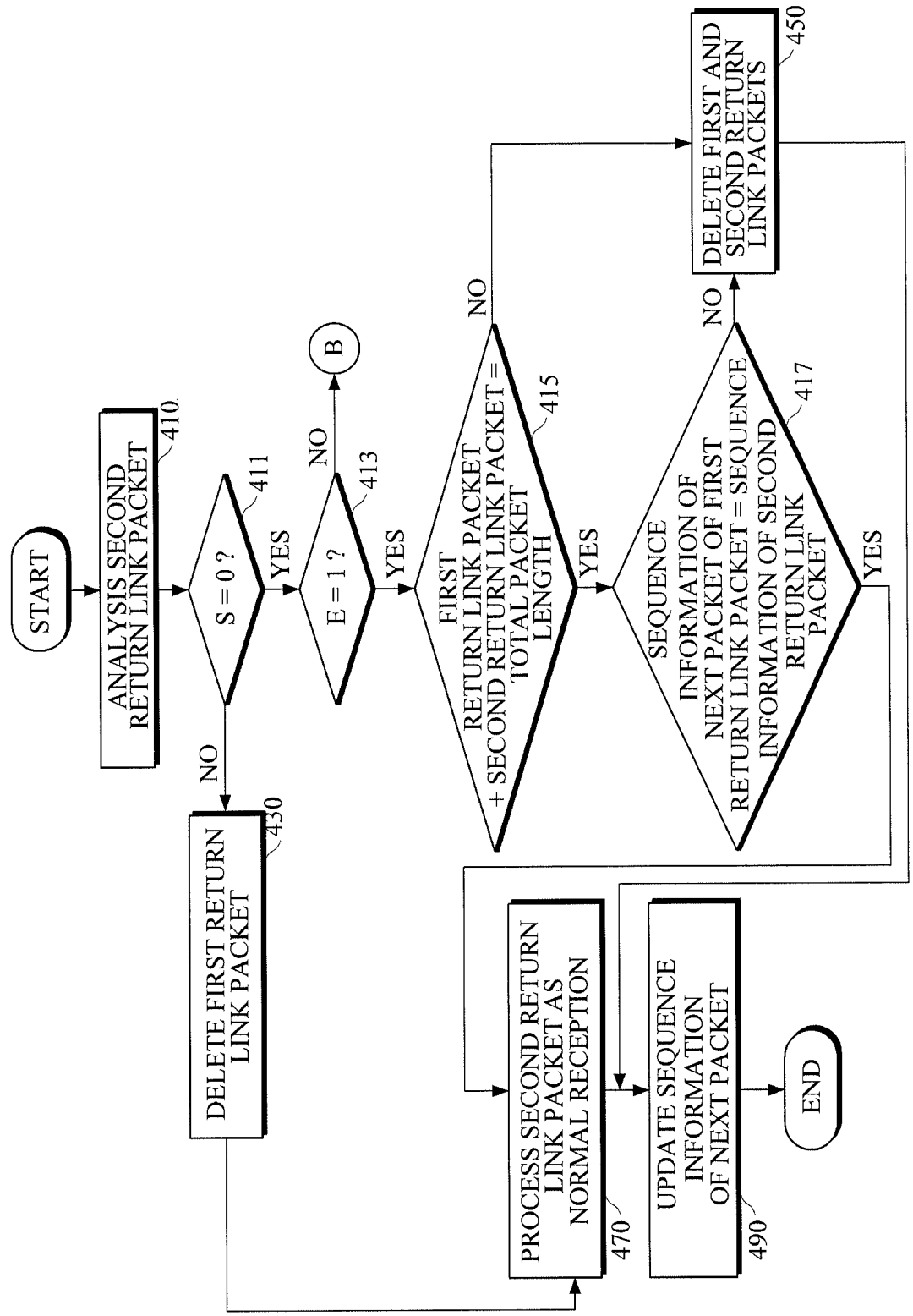
FIG. 4A illustrates an example of the control flow of a method for detecting packet errors when a first return link packet exists and a second return link packet is a start packet and an end packet.
Figure 4B:
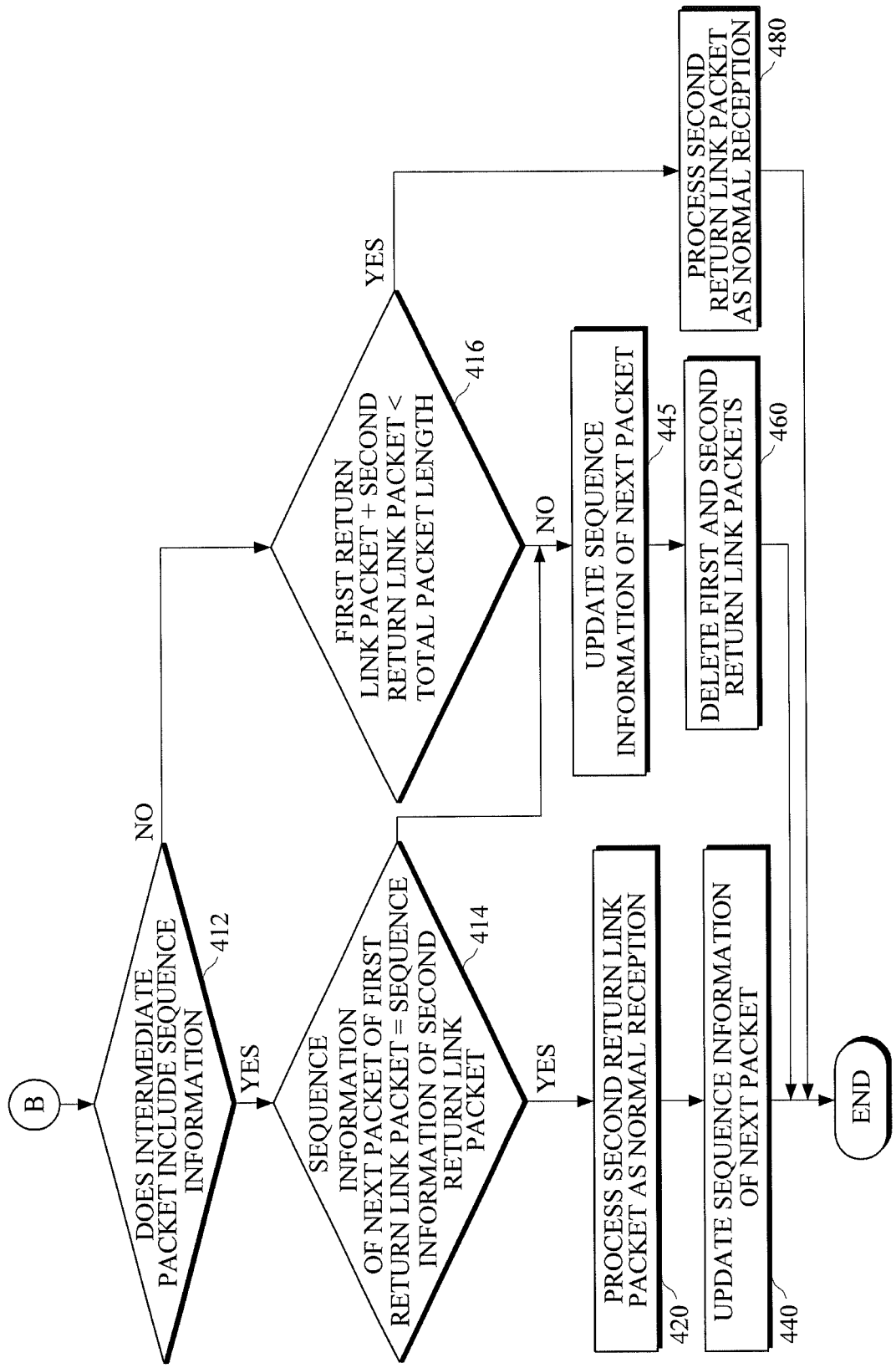
FIG. 4B illustrates an example of the control flow of a method for detecting packet errors when a first return link packet exists and a second return link packet is an intermediate packet.

FIG. 4A illustrates an example of the control flow of a method for detecting packet errors when a first return link packet exists and a second return link packet is a start packet and an end packet. FIG. 4B illustrates an example of the control flow of a method for detecting packet errors when a first return link packet exists and a second return link packet is an intermediate packet.

Referring to FIG. 4A, in a state where a first return link packet exist, a second return link packet corresponding to a next packet of the first return link packet is received and analysed (410). The structure of the return link packet has the same structure described above with reference to FIG. 2. The S/E field of the second return link packet is analyzed. It is determined whether a S bit of the S/E field is 0 (411). If the S bit is 1, the first return link packet is deleted (430). The S bit having a value of 1 indicates the packet is a packet having not been split or a start packet.

Since the presence of the first return link packet indicates that the packet assembling is not completed, the second return link packet needs to be an intermediate packet or an end packet. Accordingly, if a start packet or a return link packet which has not been split is received as the second return link packet, the first return link packet is deleted. That is, the receiving of the start packet or the return link packet having not split indicates a loss of an intermediate packet or an end packet of a second return link packet that needs to be assembled with the first return link packet. However, the second return link packet is a start packet or a packet which has not been split, and does not have a problem in generating a first return link packet. Accordingly, the second return link packet is processed as a normal reception (470).

If the S bit is 0, it is determined whether an E bit of the S/E field is 1 (413). If the S bit is 0, it is known that the second return link packet is an intermediate packet or an end packet. If the E bit is 0, the second return link packet is an intermediate packet. IF the E bit is 1, the second return link packet is an end packet. The determining of error when the E bit is 0 will be described later with reference to FIG. 4B. Hereafter, the determining of error when the E bit is 1 will be described.

If the S bit is 0 and the E bit is 1, it is determined whether the addition of the lengths of the first return link packet and the second return link packet is equal to the total packet length (415). That is, if the S bit is 0 and the E bit is 1, the second return link packet needs to be an end packet. Accordingly, the addition of the lengths of the first return link packet and the second return link packet needs to be equal to the total packet length. If the addition of the lengths of the first return link packet and the second return link packet is not equal to the total packet length, the first return link packet and the second return link packet are deleted (450). This represents that an error occurs during the assembling of the first return link and the second return link.

If the addition of the lengths of the first return link packet and the second return link packet is equal to the total packet length, it is determined whether sequence information of a next packet of the first return link packet is identical to sequence information of the second return link packet (417). If the sequence information of the next packet of the first return link packet is identical to the sequence information of the second return link packet, it is determined that the second return link packet is processed as normal reception. A process of determining the error by use of sequence information will be described later with reference to FIGS. 6A and 6B.

Referring to FIG. 4B, if the S bit is 0 and the E bit is 0, it is determined whether the intermediate packet includes sequence information (412). As described above, the intermediate packet may include sequence information of the packet as an option. Accordingly, in determining the error of packet assembly, the sequence information of the intermediate packet may be used. If the intermediate packet includes sequence information, it is determined whether sequence information of a next packet of the first return link packet is identical to the sequence information of the second return link packet (414). In this case, if the sequence information of the next packet of the first return link packet is identical to the sequence information of the second return link packet, the second return link packet is processed as a normal reception (420). However, if the sequence information of the next packet of the first return link packet is not identical to the sequence information of the second return link packet, it is determined that a packet loss occurs between the first return link packet and the second return link packet. Accordingly, the first return link packet and the second return link packet are deleted (460), and sequence information of a next packet is updated (445).

Meanwhile, if the intermediate packet does not include sequence information, it is determined that the addition of the lengths of the first return link packet and the second return link packet is equal to or smaller than the total packet length stored in the start packet (416). If the S bit is 0 and the E bit is 0, the second return link packet is an intermediate packet. Accordingly, the addition of the lengths of the first return link packet and the second return link packet needs to be equal to or smaller than the total packet length stored in the start packet. If the addition of the lengths of the first return link packet and the second return link packet is equal to or smaller than the total packet length stored in the start packet, the first return link packet and the second return link packet are determined as normal (480). That is, it is known that an error does not occur in assembling the first return link packet and the second return link packet.

If the addition of the lengths of the first return link packet and the second return link packet is larger than the total packet length stored in the start packet, the first return link packet and the second return link packet are deleted (450). That is, it is known that an error has occurred in assembling the first return link packet and the second return link packet. In detail, if the addition of the lengths is larger than the total packet length, the second return link packet is not regarded as an intermediate packet. Even if the second return link packet is an intermediate packet, since the first return link packet is determined as an error, both of the first return link packet and the second return link packet are deleted. A process of determining the error by use of sequence information of the intermediate packet will be described later with reference to FIGS. 6C and 6D.

Figure 6A:
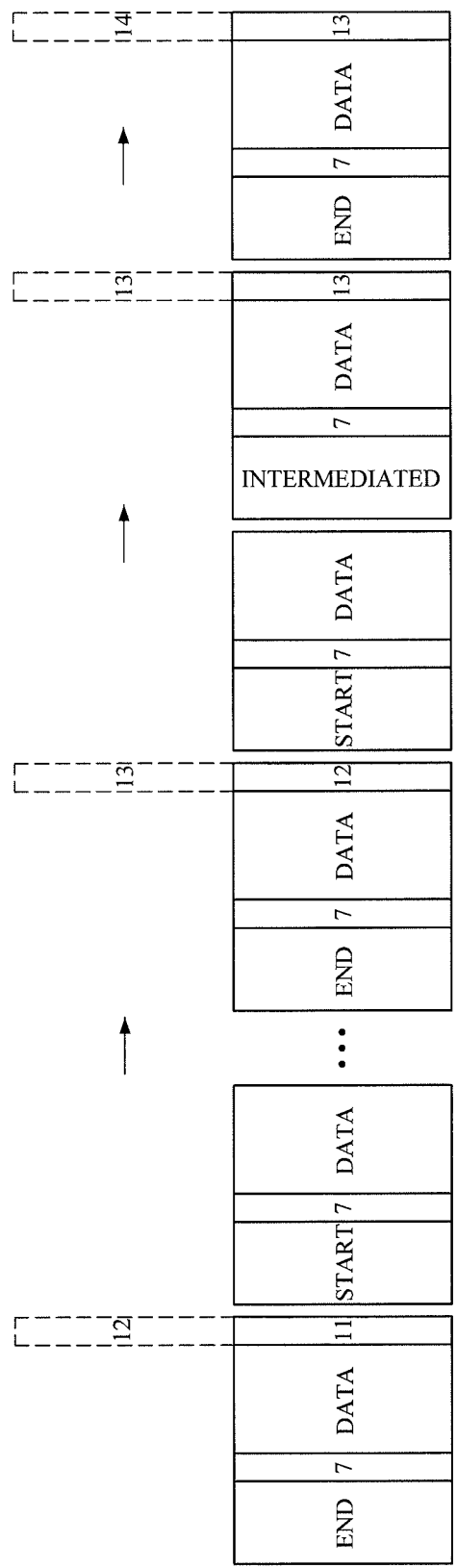
FIG. 6A illustrates a case in which an error does not occur in assembling return link packets.
Figure 6B:
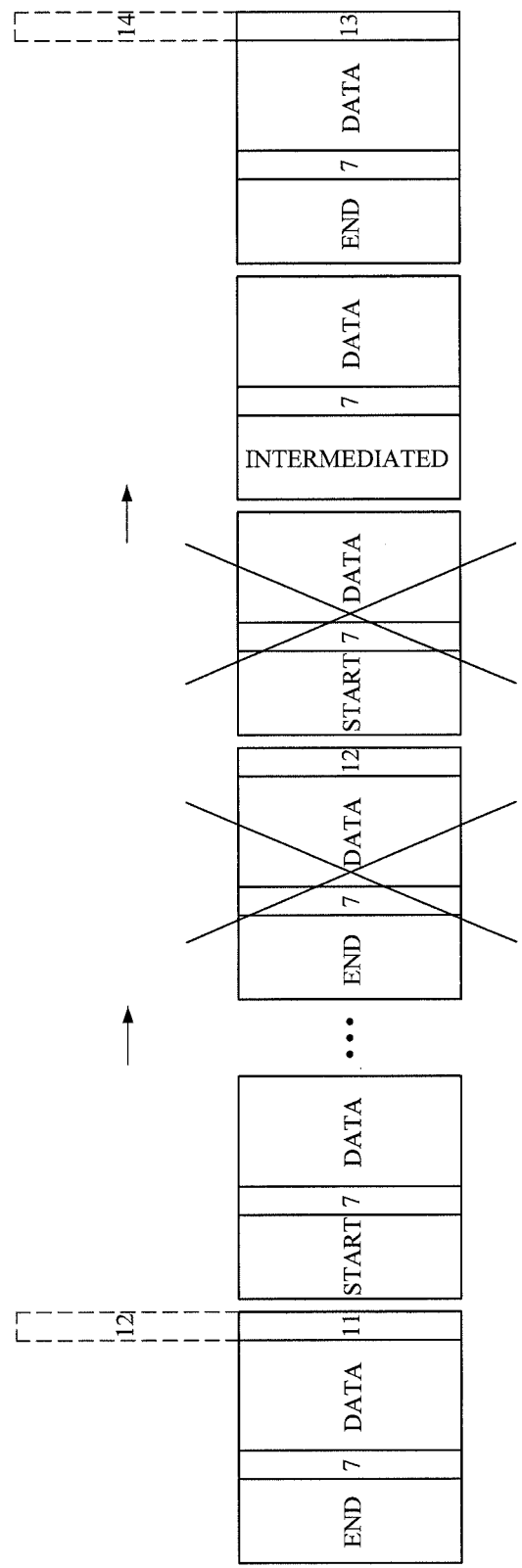
FIG. 6B illustrates a case in which an error occurs in assembling return link packets.
Figure 6C:
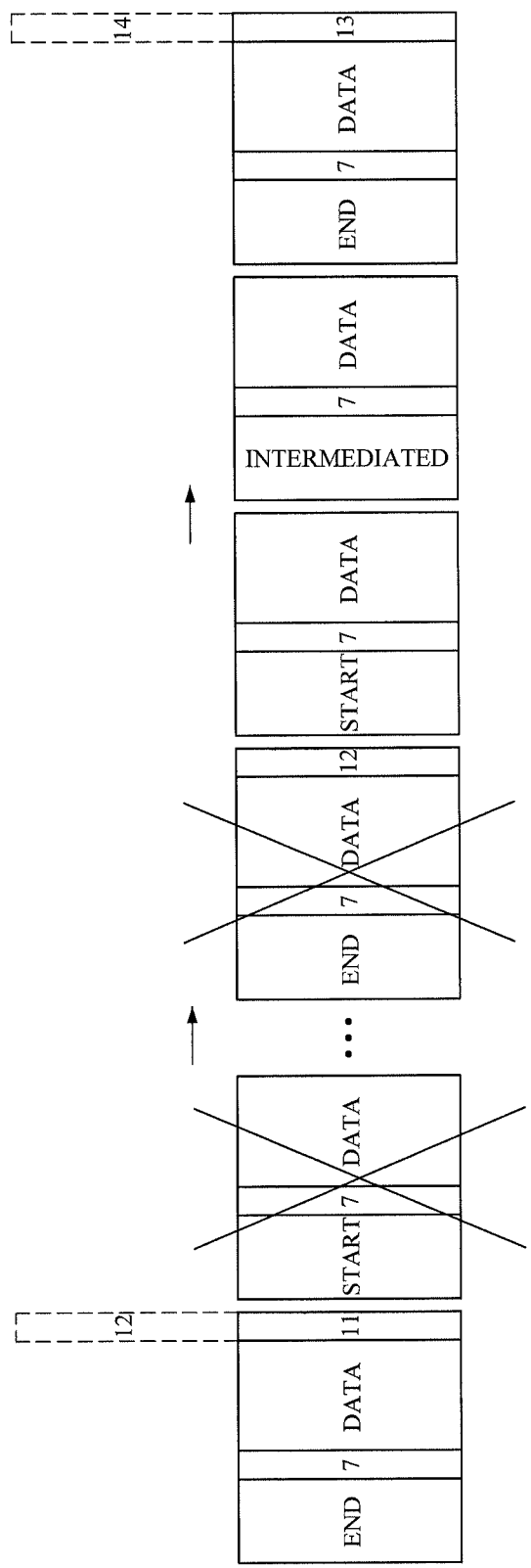
FIG. 6C illustrates a case in which an error occurs in assembling return link packets including an intermediate packet without having sequence information.

FIG. 6A illustrates a case in which an error does not occur in assembling return link packets. FIG. 6B illustrates a case in which an error occurs in assembling return link packets. FIG. 6C illustrates a case in which an error occurs in assembling return link packets including an intermediate packet without having sequence information. FIG. 6C illustrates a process of correcting an error in assembling return link packets including an intermediate packet having sequence information.

In FIG. 6A, an error does not occur in assembling the first return link packet and the second return link packet. The packet shown in the most left side of FIG. 6A is an end packet, and includes packet sequence information which is 11. This indicates that the sequence number of the current packet is 11 and a next packet followed by the current packet has a sequence number of 12. Then, a start packet, an intermediate packet and an end packet are sequentially received in the form of split packets. In this case, since the sequence information included in the end packet is 12, it is known that packets are normally received.

In addition, the second end packet indicates that sequence number of a next packet is 13. Thereafter, return link packets are received, in which it is determined that a third intermediate packet has a sequence information field which is 13 and a third end packet has a sequence information field which is 13. That is, since the received packets having sequence information expected from the second end packet are received, it is known that an error does not occur in assembling the packets.

As shown in FIG. 6B, the most left packet is a first end packet that is received first. The first end packet indicates that a packet where the first end packet belongs to has sequence information of 11 and sequence information of a next packet to be received after the first end packet is 12. Thereafter, return link packets including start packets and intermediate packets are received and assembled, so that a first return link packet is generated. As a second return link packet followed by the first return link packet, an intermediate packet and a second end packet are sequentially received. In this case, the total data length is the same as that obtained when an error does not occur. However, the second end packet indicates sequence information of 13 which is different from the sequence information of 12 that is expected from the first end packet as the sequence information of the next packet. Accordingly, it is known that an error has occurred in assembling packets.

As shown in FIG. 6C, the most left packet is a first end packet received first. The first end packet indicates a packet where the first end packet belongs to has sequence information of 11 and sequence information of a next packet to be received after the first end packet is 12. However, return link packets including a start packet and an end packet are lost and thus a first return link packet is not generated. Thereafter, a start packet, an intermediate packet and a second end packet are sequentially received to form a second return link packet. In this case, the second end packet indicates sequence information of 13 which is different from the sequence information of 12 that is expected from the first end packet as the sequence information of the next packet. Accordingly, it is known that an error has occurred in assembling packets, and the packets are deleted.

Figure 6D:
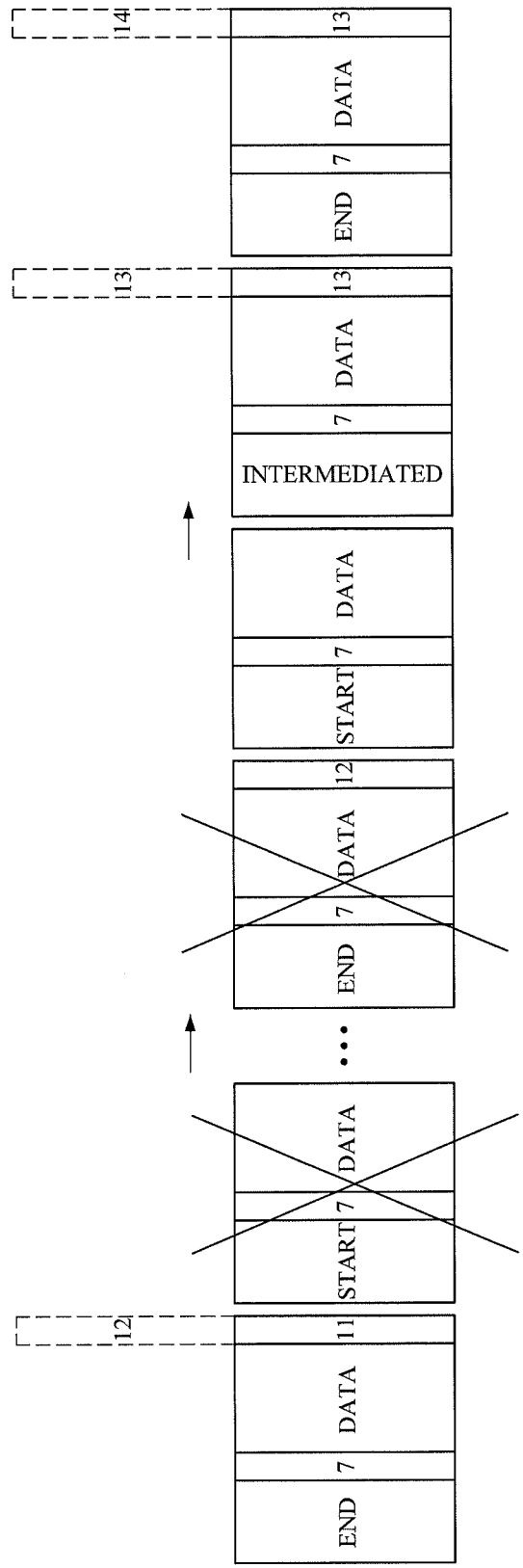
FIG. 6D shows a process of correcting an error in assembling return link packets including an intermediate packet having sequence information.

As shown in FIG. 6D, the most left packet is a first end packet received first. The first end packet indicates a packet where the first end packet belongs to has sequence information of 11 and sequence information of a next packet to be received after the first end packet is 12. Then, return link packets including a start packet and an end packet are lost and thus a first return link packet is not generated. Thereafter, a start packet, an intermediated packet having sequence information and a second end packet are sequentially received as a second return link packet. In this case, the sequence information of the next packet is changed from 12 to 13 based on the second intermediate packet. In this manner, the second end packet has sequence information of 13 which is identical to the sequence information of 13 that is expected as the sequence information of the next packet. Accordingly, a packet assembling is normally performed.

Referring again to FIGS. 4A and 4B, if the first return link packet and the second return link packet are abnormally received and deleted or the second return link packet is processed as normal, sequence information of a next packet is updated (440, 490, 445). That is, if a new start packet is received in the middle of assembling the first return link packet, sequence information of a next packet increases by one or next packet sequence information included in an intermediate packet or an end packet of the second return link packet is updated. Accordingly, when a new packet is received next and sequence number of the new packet is compared with sequence information of a next packet that is previously expected. If the sequence number of the next packet currently received is identical to the sequence information of the next packet that is previously expected, it is known that an error does not occur in assembling the first return link packet and the second return link packet.

Figure 5:
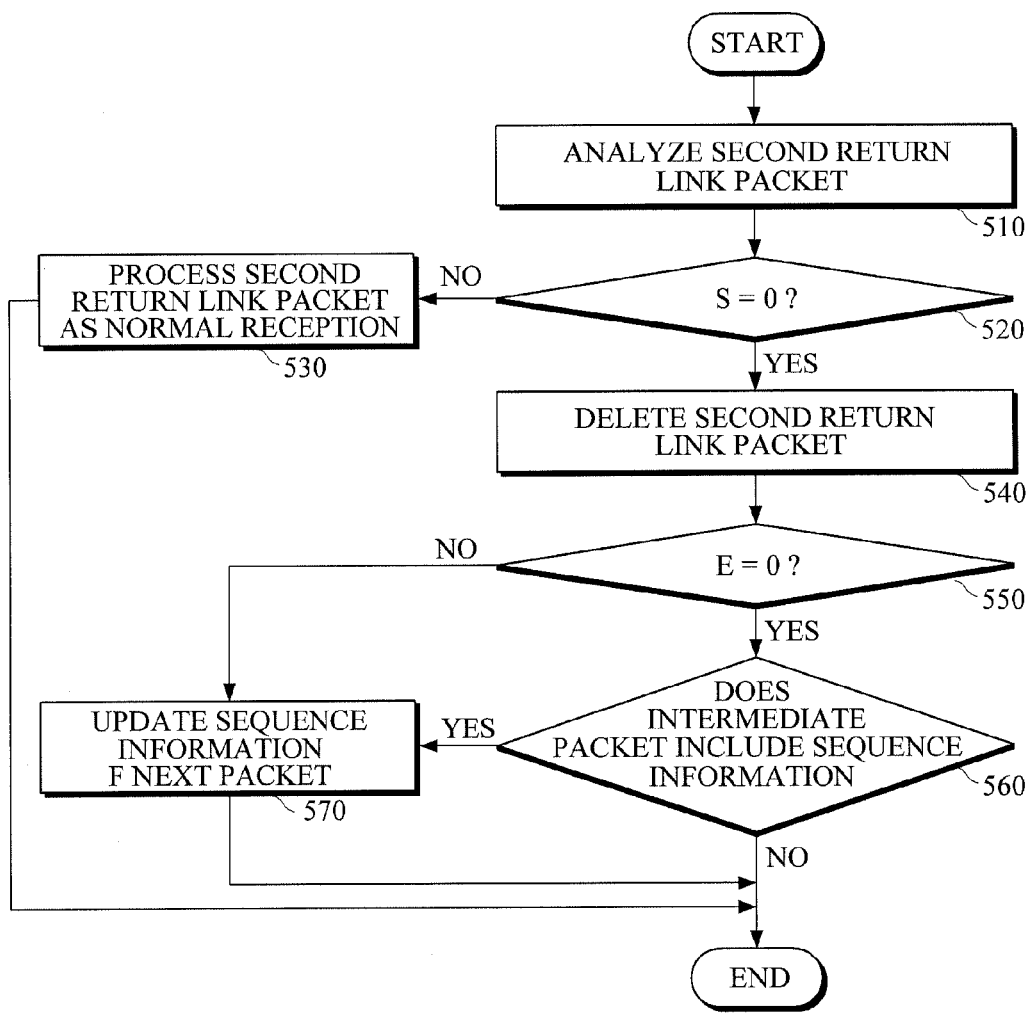
FIG. 5 illustrates an example of the control flow of a method for detecting packet errors when a first return link packet does not exist.

FIG. 5 illustrates an example of the control flow of a method for detecting packet error when a first return link packet does not exist.

Referring to FIG. 5, when a first return link packet does not exist, a received second return link packet is analyzed (510). A process of analyzing the second return link packet is identical to that described above with reference to FIGS. 4A and 4B. That is, the S/E field of the second return link packet is analyzed to determine whether the S bit is 0 (520). If the S bit is 1, the second return link is a packet which has not been split or a start packet. In this case, the second return link packet is determined as a normal reception (530).

The S bit of 0 indicates that the second return link packet is an intermediate packet or an end packet and thus it is determined that a packet loss occurs. Accordingly, the second return link packet is deleted (540). Sequentially, it is determined whether the E bit is 0 (550). If the S bit is 0 and the E bit is 1, the second return link packet is an end packet. Accordingly, sequence information of a next packet is updated (570). If the E bit is 0, the second return link packet is an intermediate packet. Accordingly, it is determined whether the intermediate packet includes sequence information (560). If the intermediate packet includes sequence information, the sequence information of a next packet is updated (570). If the intermediate packet does not include sequence information, the sequence information of a next packet is not updated.

Referring again to FIG. 1, a modulation and coding (MODCOD) value is calculated based on the occurrence of an error in the first return link packet or the second return link packet and the calculated MODCOD value is transmitted to the satellite terminal device (140). That is, if a received return link packet has an error, the MODCOD value to be transmitted to the satellite terminal device is modified. That is, if a current weather condition around the satellite terminal device is severe, the MODCOD value is modified to achieve a seamless data transmission.

The satellite terminal device receives the modified MODCOD value, performs encapsulation on the return link packet by use of an Adaptive Coding and Modulation and provides a hub with a two way satellite communication service using a return link.

Figure 7:
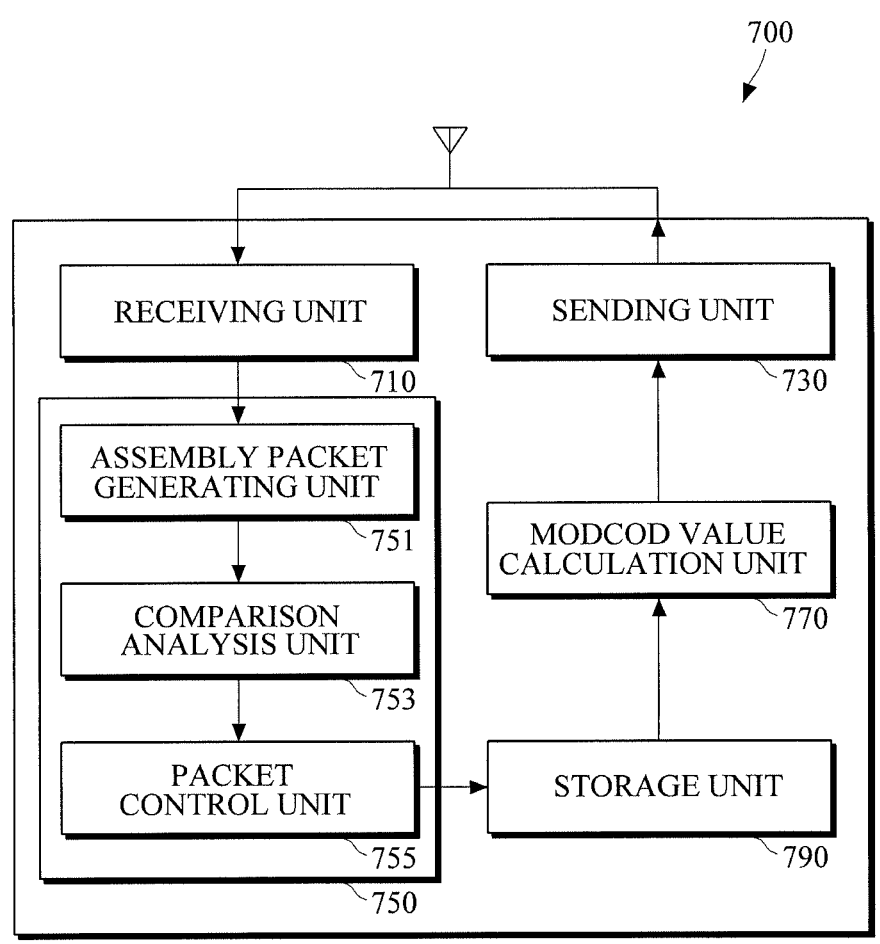
FIG. 7 shows an example of the configuration of an apparatus for detecting a return link packet error.

FIG. 7 illustrates an example of the configuration of an apparatus for detecting a return link packet error.

As shown in FIG. 7, a return ink packet error detecting apparatus 700 includes a receiving unit 710, a sending unit 730, an error detection unit 750, a MODCOD value calculation unit 770 and a storage unit 790. The receiving unit 710 and the sending unit 730 are configured to receive and transmit data to achieve a two way satellite communication with a satellite terminal device through a satellite. The sending unit 730 transmits data to the satellite terminal device through a forward link, and the receiving unit 710 receives data from the satellite terminal device through a return link.

The error detection unit 750 receives a return link packet, which is received from the satellite terminal device, through the receiving unit 710. The error detection unit 750 detects the packet error by comparing a first return link packet with a second return link packet based on the data length of the first return link packet. In addition, the error detection unit 750 detects the packet error by determining the presence of the first return link packet and by performing a comparison analysis on fragmentation information of the second return link packet. In addition, the error detection unit 750 detects the occurrence of the packet error by checking sequence information included in the first return link packet and sequence information of a next packet and by comparing sequence information of the second return link packet with the sequence information of the next packet.

In addition, the error determination unit 750 includes an assembly packet generating unit 751, a comparison analysis unit 753 and a packet control unit 755. The assembly packet generating unit 751 is configured to generate a first return link packet by sequentially assembling return link packets. The assembly packet generating unit 751 assembles the return link packets based on a predetermined packet length. The first return link may be an incomplete packet needing to be assembled with an intermediate packet or an end packet to form a complete packet. The assembly packet generating unit 751 outputs the first return link packet to the comparison analysis unit 753.

The comparison analysis unit 753 is configured to perform the comparison analysis by comparing the first return link packet that is received from the assembly packet generating unit 751 with a second return link packet that is received after the first return link packet. The comparison analysis unit 753 analyzes fragmentation information, total length information and sequence information through the second return link packet. The comparison analysis unit 753 outputs a result of the comparison analysis indicating whether an error occurs in assembling packets to the packet control unit 755.

The packet control unit 755 receives information indicating whether an error occurs in assembling packets from the comparison analysis unit 753. Based on the received information, the packet control unit 755 deletes the first return link packet and/or the second return link packet. The packet control unit 755 stores return link packets in the storage unit 790. The storage unit 790 stores a first return link packet which does not have a packet assembly error or a second return link packet which does not have an error in reception. In addition, the storage unit 790 stores error related information.

The MODCOD value calculation unit 770 modifies a MODCOD value, which is to be transmitted to the satellite terminal device, based on the error related information stored in the storage unit 790. In the conventional technology where a return link packet is modulated by use of a MODCOD value having been transmitted, the return link packet may experience packet loss in the course of transmission. However, according to this example capable of preventing such a packet loss, a modified MODCOD value is calculated and then the calculated MODCOD value is transmitted to the satellite terminal device. Accordingly, the satellite terminal device produces a return link packet by use of an Adaptive Coding and Modulation scheme based on the new MODCOD value and transmits the produced return ink packet to the hub.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for detecting a return link packet error in a hub which communicates with a satellite terminal device, the method comprising:
   receiving a plurality of return link packets from the satellite terminal device; and
   detecting an occurrence of a packet error by generating a first return link packet by sequentially assembling the plurality of return link packets and performing a comparison analysis by comparing the first return link packet with a second return link packet that is received next.

2. The method of claim 1, where the detecting of the occurrence of the packet error comprises:

generating the first return link packet by sequentially assembling the return link packets according to fragmentation information about the return link packets;

performing the comparison and analysis by comparing the first return link packet with the second return link packet; and deleting the first return link packet and/or the second return link packet according to a result of the comparison analysis.

3. The method of claim 1, wherein the return link packet represents a packet which is split to one of a start packet, an intermediate packet and an end packet in the satellite terminal device, and the intermediate packet and/or the end packet includes sequence information of the packet.

4. The method of claim 3, wherein the return link packet includes at least one of packet fragmentation information, packet sequence information, fragment ID information and sequence alignment (SA) information.

5. The method of claim 3, wherein in the detecting of the occurrence of the packet error, if the first return link packet includes the end packet, sequence information included in the end packet and sequence information of a next packet are checked, and if the second return link packet is the intermediate packet, the sequence information of the end packet included in the first return link packet is compared with the sequence information of the next packet.

6. The method of claim 3, wherein in the detecting of the occurrence of the packet error, if the first return link packet includes the end packet, sequence information included in the end packet and sequence information of a next packet are checked, and if the second return link packet is the end packet, the sequence information of the end packet included in the first return link packet is compared with the sequence information of the next packet.

7. The method of claim 1, wherein in the detecting of the occurrence of the packet error, the first return link packet is compared with the second return link packet based on a data length of the first return link packet.

8. The method of claim 1, wherein in the detecting of the occurrence of the packet error, a presence of the first return link packet is detected and fragmentation information about the second return link packet is subject to comparison and analysis.

9. The method of claim 1, further comprising:

calculating a modulation and coding (MODCOD) value based on the occurrence of an error of the first return link packet or the second return link packet, and transmitting the calculated MODCOD to the satellite terminal device.

\* \* \* \* \*